United States Patent [19]

Ishimori et al.

[11] Patent Number: 4,691,802
[45] Date of Patent: Sep. 8, 1987

[54] AGRICULTURAL TRACTOR

[75] Inventors: Shoso Ishimori; Seiichi Ishiizumi; Mikio Ishida, all of Sakai, Japan

[73] Assignee: Kubota, Ltd., Osaka, Japan

[21] Appl. No.: 750,105

[22] Filed: Jun. 28, 1985

[30] Foreign Application Priority Data

Jul. 10, 1984 [JP] Japan .......................... 59-104657[U]
Jul. 17, 1984 [JP] Japan .......................... 59-108703[U]
Jul. 17, 1984 [JP] Japan ................................ 59-148958

[51] Int. Cl.⁴ ............................................. B60K 17/10
[52] U.S. Cl. ..................................... 180/291; 60/490; 74/467; 74/606 R; 180/306; 180/900
[58] Field of Search ............... 180/291, 292, 900, 305, 180/306, 307; 184/6.12; 60/489, 490; 74/606 R, 467, 687, 718, 720, 689

[56] References Cited

U.S. PATENT DOCUMENTS

| 2,995,211 | 8/1961 | Cohen | 184/6.12 |
| 3,311,186 | 3/1967 | Kamlukin | 180/291 |
| 4,126,201 | 11/1978 | Stevens | 74/606 R |
| 4,526,061 | 7/1985 | Sakakibara et al. | 74/689 |
| 4,526,062 | 7/1985 | Sakakibara et al. | 74/689 |
| 4,574,910 | 3/1986 | Miki et al. | 180/900 |

FOREIGN PATENT DOCUMENTS 2323947 11/1974 Fed. Rep. of Germany .

Primary Examiner—John J. Love
Assistant Examiner—Eric D. Culbreth
Attorney, Agent, or Firm—Jordan and Hamburg

[57] ABSTRACT

An agricultural tractor in which a transmission case comprises a front case portion housing a hydraulic stepless change speed mechanism and a rear case portion housing a gear mechanism. A partition wall is interposed between the front and rear case portions, and a tractor frame is secured to the partition wall by means of bolts.

7 Claims, 11 Drawing Figures

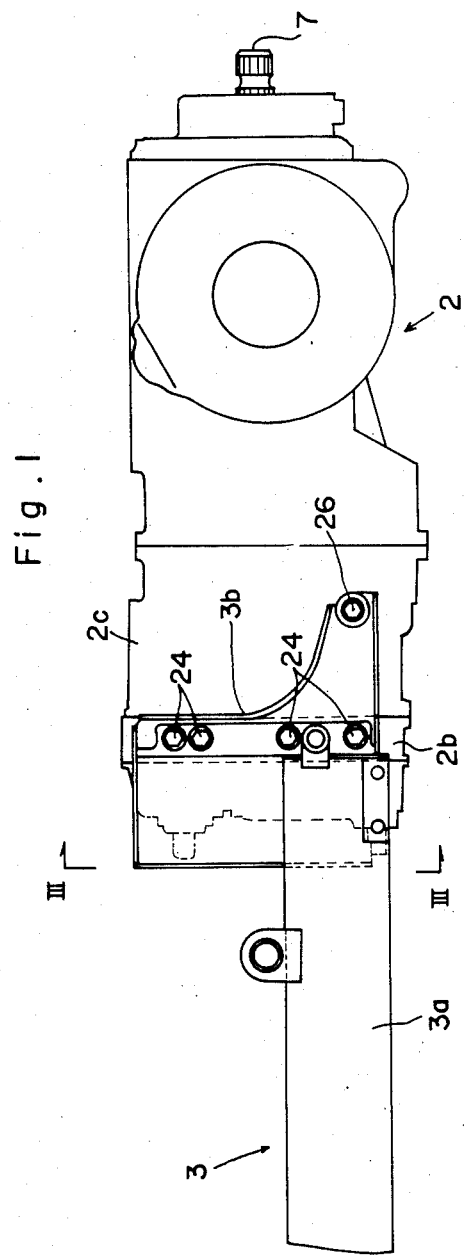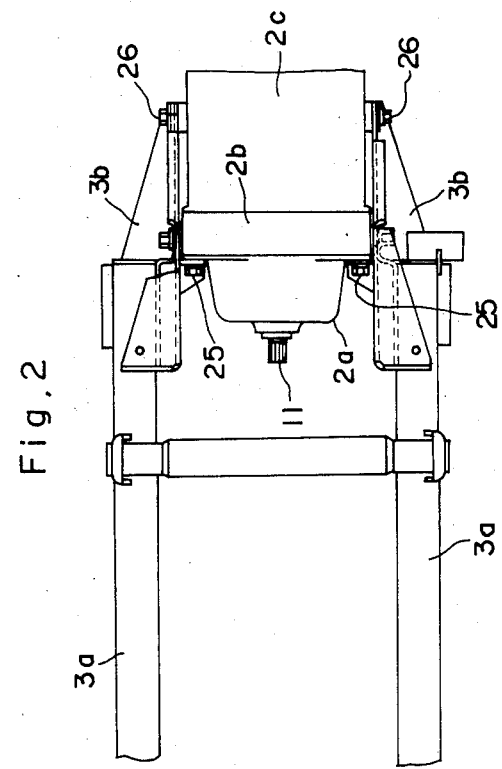

AGRICULTURAL TRACTOR

BACKGROUND OF THE INVENTION

This invention relates to an agricultural tractor comprising a tractor body including an engine, a transmission case housing a hydraulic stepless change speed mechanism and a gear mechanism, and a frame connecting the engine and the transmission case.

In known agricultural tractors of the type noted above, the frame and the transmission case are interconnected by a plurality of bolts screwed to lateral walls of the transmission case defining a space for housing the gear mechanism. With such a known construction it is necessary to form the entire transmission case or bolt receiving parts thereof to be thick in order that the bolts may be secured to the transmission case with sufficient rigidity. This renders the transmission case heavy and its overall configuration complicated. This problem is particularly noticeable where the transmission case is formed of an aluminium alloy in the interest of lightness.

SUMMARY OF THE INVENTION

Accordingly, the object of this invention is to provide an agricultural tractor with a lightweight and simple transmission case to which the bolts are secured with sufficient rigidity.

In order to achieve this object an agricultural tractor according to this invention as noted at the outset hereof is characterized by the feature that a pluraity of bolts connecting the frame and the transmission case are mostly screwed to a partition wall dividing the transmission case into a front case portion and a rear case portion. This construction has the following advantages.

The above partition wall extends from one lateral wall of the transmission case to the other in order to act as support for a gearing mechanism. Further, the partition wall is formed thick in order to define therein oil passages for actuating the hydraulic stepless change speed mechanism. Therefore, the partition wall is adapted to receive sufficient lengths of connecting bolts in both longitudinal and transverse directions of the tractor body, without additional bolt-receiving portions projecting from outer faces thereof. Even if such additional portions are provided, these portions need only to poject a relatively small amount. The construction according to this invention permits the connecting bolts to be screwed to the transmission case with sufficient rigidity, even if the case portion for housing the gearing mechanism is formed of a relatively thin material. When the projecting bolt-receiving portions are provided, most of these portions may be provided on the partition wall thereby leaving the case portion for housing the gearing mechanism to be relatively simple in construction.

This invention is advantageous particularly where the transmission case portion for housing the gearing mechanism is formed of an aluminium alloy. The frame and the transmission case are interconnected with sufficient rigidity to render the tractor body strong while, on the other hand, the transmission case is lightweight and simple and has advantages of handling ease and economy.

Moreover, the described construction has the tractor frame secured to the partition wall which acts as an intermediate member connecting the transmission case portion for housing the hydraulic stepless change speed mechanism and the transmission case portion for housing the gearing mechanism, a member for supporting shafts of the gearing mechanism, and a member defining the oil passages. Such a multi-functioning of the single component, i.e. the partition wall, promotes simplification of the construction.

Other advantages of this invention will be apparent from the following description.

BRIEF DESCRIPTION OF THE DRAWINGS

The drawings illustrate an agricultural tractor embodying this invention, in which:

FIG. 1 is a side view of a connection between a tractor frame and a transmission case, FIG. 2 is a plan view of the connection between the frame and the transmission case.

DESCRIPTION OF THE PREFERRED EMBODIMENT

Figure 6:
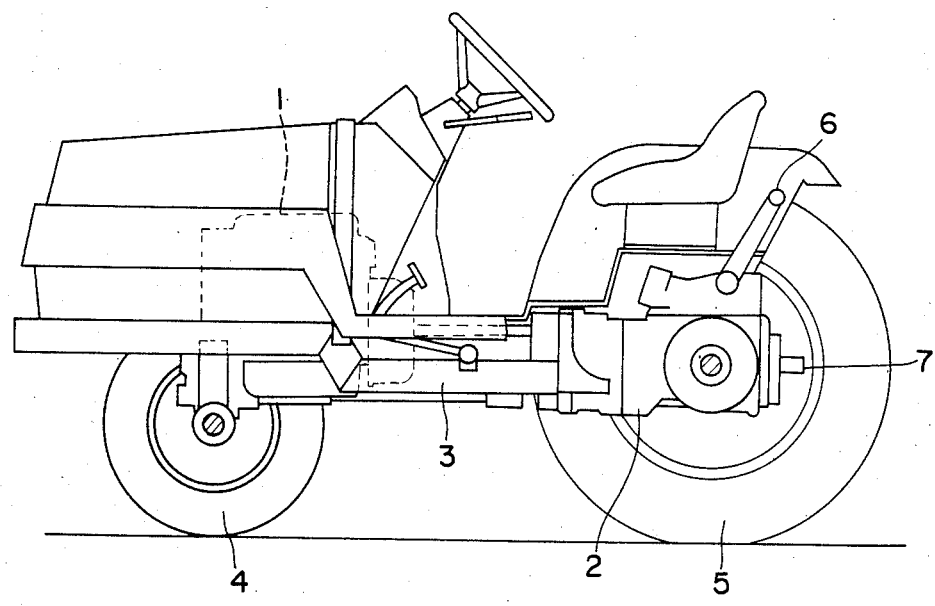
FIG. 6 is partly broken away side elevation of the tractor.

FIG. 6 shows a riding type agricultural tractor. The tractor, as seen, comprises a tractor body including an engine 1, a transmission case 2, and a frame 3 interconnecting the engine 1 and the transmission case 2. The tractor further comprises front wheels 4, rear wheels 5, a lift arm 6 for coupling to a working implement such as a rotary plow and for raising and lowering the same, and a power takeoff shaft 7 for transmitting power to the working implement.

Figure 4:
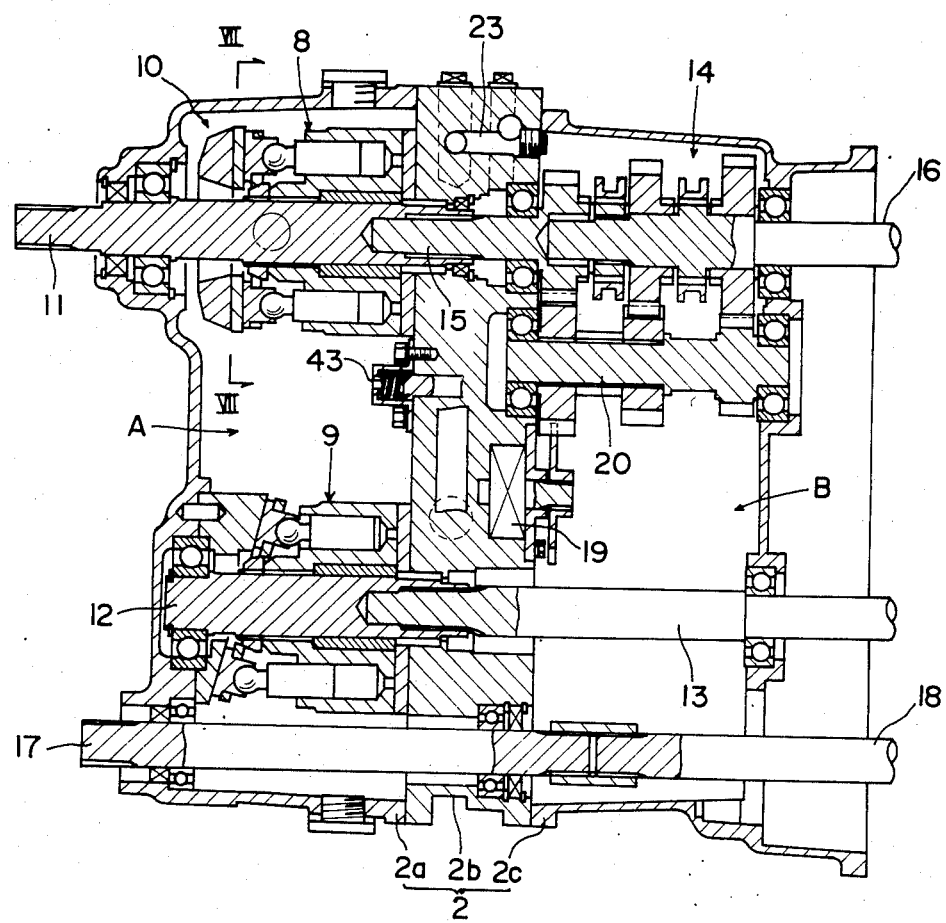
FIG. 4 is a sectional view of a transmission.

Referring to FIG. 4, the transmission case 2 comprises a front case portion 2a formed of iron, a partition wall portion 2b formed of iron and a rear case portion 2c formed of an aluminium alloy. The partition wall portion 2b divides an interior space of the transmission case 2 into a front housing space A and a rear housing space B. The front housing space A houses a hydraulic pump 8 and a hydraulic motor 9 which together constitute a hydraulic stepless change speed mechanism 10 forming part of a propelling drive transmission system of the tractor. The change speed mechanism 10 receives power of the engine 1 through an input shaft 11 and transmits the power through an output shaft 12 and a rotary shaft 13 to an auxiliary change speed gear mechanism (not shown) housed in the rear housing space B. The rear housing space B further houses a power takeoff gear mechanism 14 including an input shaft 15 directly coupled to the input shaft 11 and an output shaft 16 for transmitting the power to the power takeoff shaft 7. The front case portion 2a and the partition wall portion 2b support a transmission shaft 17 for driving the front wheels 4, the transmission shaft 17 being coupled to an output shaft 18 of the auxiliary change speed gear mechanism.

Figure 5:
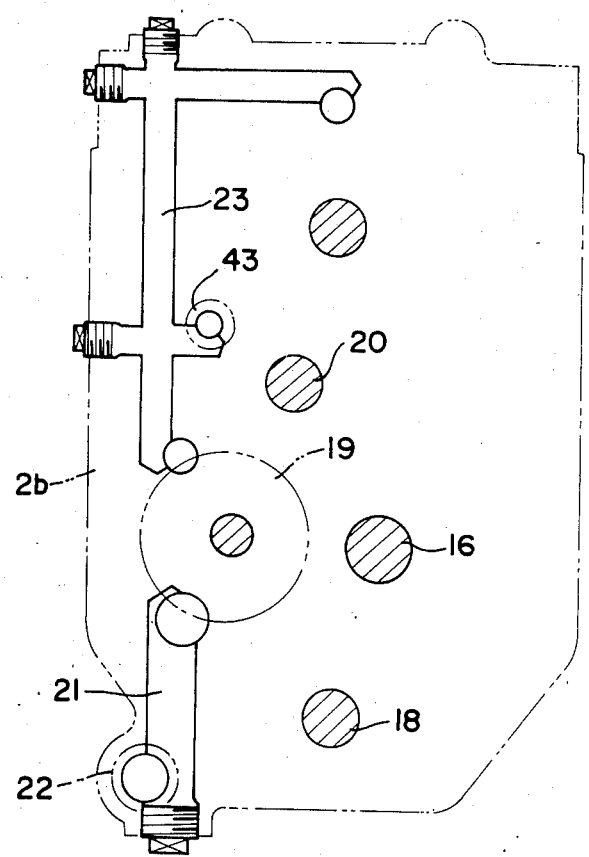
FIG. 5 is a sectional view of charge oil passages.

As shown in FIG. 4, the partition wall portion 2b defines a mounting bore in which a trochoid charge pump 19 is mounted, the latter being operatively connected by gears to a constantly rotating shaft 20 of the power takeoff mechanism 14. An intake end of the change pump 19 communicates with a bottom portion of the rear housing space B through an oil passage 21 and a filter 22 defined in the partition wall portion 2b as shown in FIG. 5. An outlet end of the charge pump 19 is connected to the stepless change speed mechanism 10 through an oil passage 23 defined in the partition wall portion 2b as shown in FIGS. 4 and 5. Thus, the charge pump 19 is adapted to supply the stepless change speed mechanism 10 with lubricating oil taken from the rear housing space B as pressure oil. Number 43 in the drawings denotes a relief valve for the charge pump 19.

Figure 3:
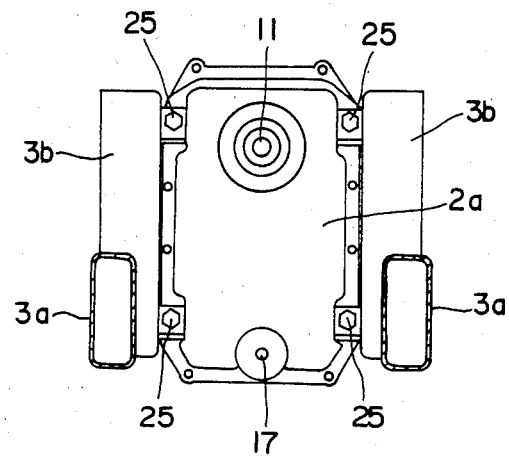
FIG. 3 is a sectional view taken on line III—III of FIG. 1.

Referring to FIGS. 1 through 3, the frame 3 includes a pair of right and left main frame portions 3a each having a coupling member 3b at a rear end thereof for coupling to the transmission case 2. Each coupling member 3b is secured to a lateral side of the partition wall portion 2b by four bolts 24 arranged vertically and extending transversely of the tractor body. Furthermore, each coupling member 3b is secured, together with the front case portion 2a, to a front case of the partition wall portion 2b by two bolts 25 arranged vertically and extending longitudinally of the tractor body. The coupling member 3b is secured also to the rear case portion 2c by a single bolt 26 disposed rearwardly of the bolts 24 and 25 and extending transversely of the tractor body.

Figure 7:
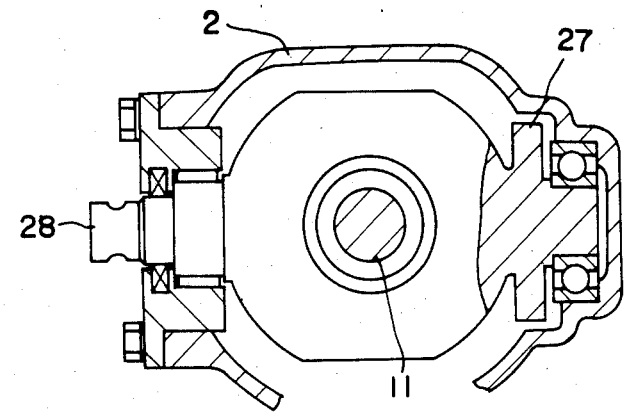
FIG. 7 is a sectional view taken on line VII—VII of FIG. 4.
Figure 10:
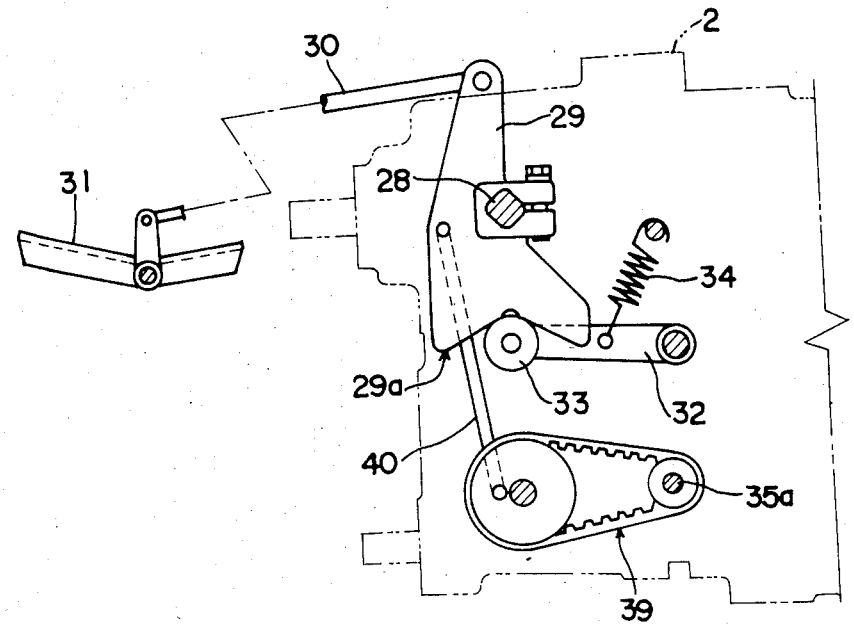
FIG. 10 is a side view of a control structure for controlling a stepless change speed mechanism.
Figure 11:
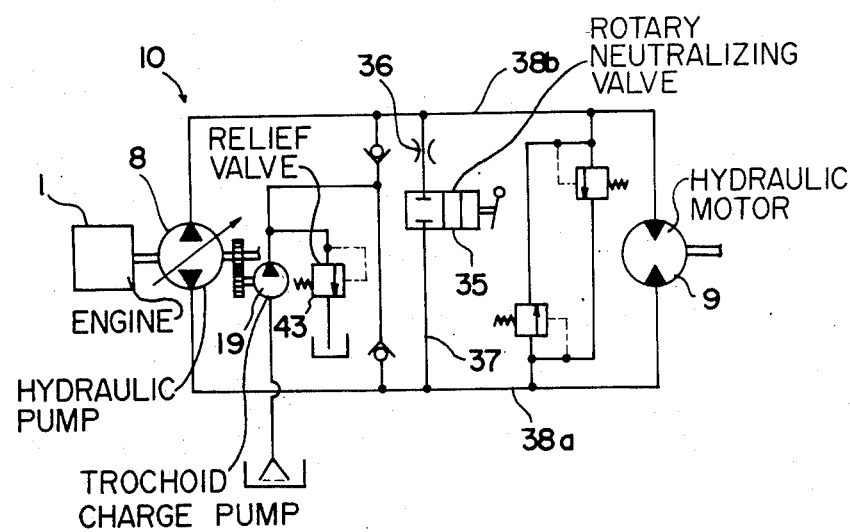
FIG. 11 is a diagram of a hydraulic circuit for the stepless change speed mechanism.

The stepless change speed mechanism 10 is operable in conventional means by a hydraulic circuit as shown in FIG. 11. As shown in FIG. 7, there is provided a control shaft 28 for turning the change speed mechanism 10, the control shaft 28 having a weight 27 disposed in the transmission case 2 for checking rotational vibrations due to hydraulic pressure. The control shaft 28 is operatively connected to a control pedal 31 through an oscillatable link member 29 and a push-pull rod 30 as shown in FIG. 10. The tractor travels forward when a forward part of the pedal 31 is depressed, and travels backward when a rearward part of the pedal 31 is depressed. An oscillatable arm 32 connects a roller 33 to the transmission case 2. The roller 33 is biased by a spring 34 against a cam surface 29a defined in a bottom of oscillatable link member 29. Thus, the control shaft 28 and the pedal 31 automatically return to neutral when the driver removes his foot from the pedal 31.

Figure 8:
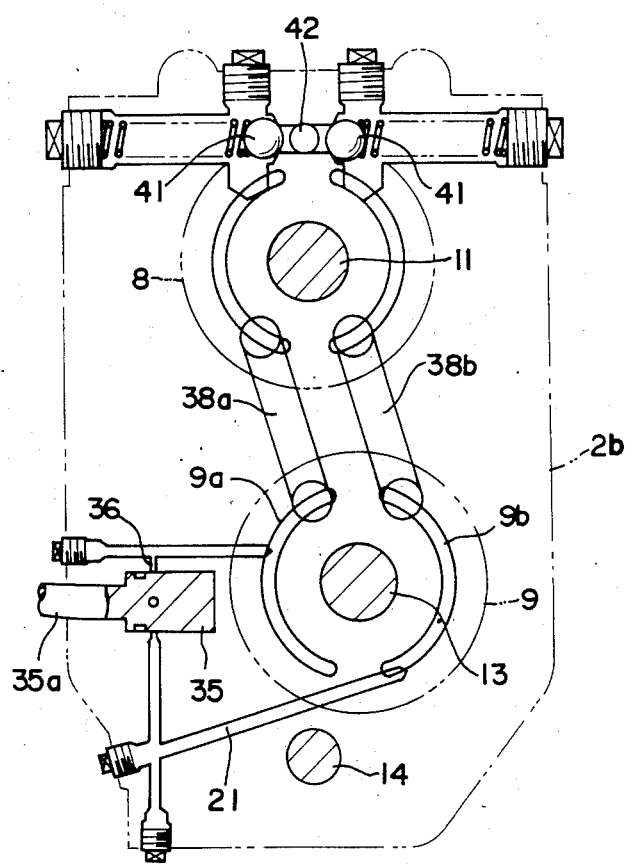
FIG. 8 is a sectional view of oil lines.
Figure 9:
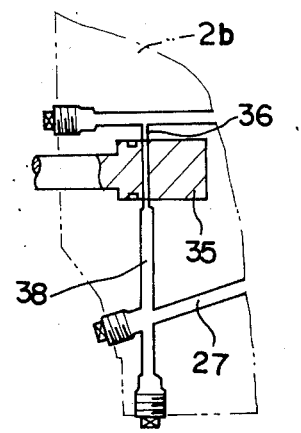
FIG. 9 is a sectional view of a neutralizing valve in an open position.

As shown in FIG. 8, a rotary type neutralizing valve 35 is mounted in a mounting bore defined in the partition wall portion dividing the interior of the transmission case 2 into the front housing space A housing the hydraulic stepless change speed mechanism 10 and the rear housing space B housing the power takeoff gear mechansim 14. The neutralizing valve 35 is connected to inner oil passages 9a and 9b of the hydraulic motor 9 through an oil passage 37 defined in the partition wall portion 2b and including a constricted passage portion 36. A pair of oil passages 38a and 38b are defined in the partition wall portion 2b for connecting the hydraulic pump 8 and the hydraulic motor 9. The neutralizing valve 35 has a control shaft 35a operatively connected to the oscillatable link member 29 through a belt type interlocking device 39 and a push-pull link 40, whereby oscillations of the link member 29 are transmitted to the control shaft 35a in increased strokes. When the hydraulic stepless change speed mechanism 10 is in a forward drive position or a backward drive position, the valve 35 is closed to place the oil passages 38a and 38b out of communication, thereby to permit the hydraulic motor 9 to be driven. When the hydraulic stepless change speed mechanism 10 is in neutral, the valve 35 is opened as shown in FIG. 9 to place the oil passages 38a and 38b into communication with each other through the oil passage 37, thereby to positively stop the hydraulic motor 9.

The outlet end of the change pump 19 is connected to the hydraulic pump 8 through an oil passage 42 defined in the partition wall portion 2b and a check valve 41 for controlling an oil supply from the change pump 19 is mounted in a mounting bore defined in the partition wall portion 2b, as shown in FIG. 8. Thus, the lubricating oil contained in the transmission case 2 is supplied by the charge pump 19 to the hydraulic stepless change speed mechanism 10 as pressure oil.

A pump casing may be mounted together with the charge pump in the mounting bore defined in the partition wall portion 2a.

The described embodiment in which the neutralizing valve 35 is mounted in the partition wall portion 2b has the advantage of constructional simplicity since the partition wall portion 2a acts also as valve casing. However, it will be understood that the valve 35 may have a valve casing which is a separate entity from the partition wall portion 2b and is mounted therein together with the valve 35.

What is claimed is:

1. An agricultural tractor comprising:
   a front transmission case portion (2a),
   hydraulic stepless change speed means (10) housed in the front transmission case portion (2a),
   a rear transmission case portion (2c),
   gearing means (14) housed in the rear transmission case portion (2c),
   a partition wall portion (2b) disposed between and interconnecting the front and rear transmission case portions (2a, 2c), the partition wall portion (2b) having passages defining the sole oil passages (21,23) for actuating said hydraulic stepless change speed means (10), said partition wall portion (2b) having an exterior wall exposed to the ambiance, and
   a tractor frame (3) carrying an engine (1) and fixedly connected to said exterior wall of said partition wall portion (2b) by bolt means (24,25,26).

2. An agricultural tractor as claimed in claim 1 wherein the partition wall portion (2b) includes, mounted therein, a pressure oil charge pump (19) for supplying pressure oil to the hydraulic stepless change speed means (10).

3. An agricultural tractor as claimed in claim 2 wherein the partition wall portion (2b) includes, mounted therein, a neutralizing valve (35) for controlling the hydraulic stepless change speed means (10).

4. An agricultural tractor as claimed in claim 3 wherein the partition wall portion (2b) includes, mounted therein, a relief valve (43) for the hydraulic stepless change speed means (10).

5. An agricultural tractor as claimed in claim 3 or 4 wherein the partition wall portion (2b) includes, mounted therein, a filter (22) for the hydraulic stepless change speed means (10).

6. The agricultural tractor of claim 1 wherein said hydraulic stepless change speed means comprises a hydraulic pump and a hydraulic motor.

7. The agricultural tractor of claim 6 wherein said oil passages comprise substantially the sole passages for driving said hydraulic motor from said hydraulic pump.

* * * * *